(12) United States Patent  (10) Patent No.: US 9,157,777 B2
Kittaka et al.  (45) Date of Patent: Oct. 13, 2015

(54) ELECTROMAGNETIC FLOWMETER, ELECTROMAGNETIC FLOW RATE MEASUREMENT SYSTEM, AND ELECTROMAGNETIC FLOW RATE MEASUREMENT METHOD

(75) Inventors: Daigo Kittaka, Kanagawa (JP); Ryoichi Sugawara, Kanagawa (JP); Noriyuki Takeshima, Kanagawa (JP); Masafumi Komai, Kanagawa (JP); Mitsuhiro Enomoto, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/004,571

(22) PCT Filed: Mar. 23, 2012

(86) PCT No.: PCT/JP2012/002022
§ 371 (c)(1),
(2), (4) Date: Sep. 11, 2013

(87) PCT Pub. No.: WO2012/132363
PCT Pub. Date: Oct. 4, 2012

(65) Prior Publication Data
US 2014/0007697 A1  Jan. 9, 2014

(30) Foreign Application Priority Data
Mar. 25, 2011 (JP) .................. 2011-068879

(51) Int. Cl.
*G01F 1/58* (2006.01)
*G21C 17/032* (2006.01)
*G01F 1/60* (2006.01)

(52) U.S. Cl.
CPC *G01F 1/588* (2013.01); *G01F 1/60* (2013.01); *G21C 17/032* (2013.01)

(58) Field of Classification Search
CPC ........................................ G01F 1/58
USPC ................................ 73/861.11, 861.12, 861.15
See application file for complete search history.

(56) References Cited

U.S. PATENT DOCUMENTS 3,566,687 A   3/1971  Mittelmann
4,736,635 A * 4/1988  Murase ................. 73/861.15

(Continued)

FOREIGN PATENT DOCUMENTS

| JP | 54-115163 A | 9/1979 |
| JP | 62-188910 A | 8/1987 |
| JP | 63-140917 A | 6/1988 |
| JP | 05-010796 A | 1/1993 |

(Continued)

*Primary Examiner* — Jewel V Thompson
(74) *Attorney, Agent, or Firm* — Foley & Lardner LLP

(57) ABSTRACT

An electromagnetic flow meter comprises: an excitation member (5) in which a plurality of magnets (5a, 5b, 5c) are arranged spaced apart from one another along an outer circumferential surface of a flow channel (1) through which liquid metal flows, and in which a magnetic field is formed in a direction perpendicular to the outer circumferential surface of the flow channel (1); and electrodes (6a, 6b) provided between the magnets (5a, 5b, 5c) of the excitation member (5), for measuring the voltage generated when the liquid metal crosses the magnetic field. A pulse excitation electric-current supply device (7a) for supplying a pulsed excitation current to the excitation member (5) is provided, whereby a flow speed distribution can be suppressed from being generated in the circumferential direction of the channel (1) even when the flow speed of the liquid metal is low, and the flow rate can be accurately measured.

11 Claims, 6 Drawing Sheets

(56) References Cited

U.S. PATENT DOCUMENTS

| | | |
|---|---|---|
| 7,628,080 B1 | 12/2009 | Feller |
| 8,826,716 B2 * | 9/2014 | Asada et al. .................. 73/1.16 |
| 2002/0050175 A1 | 5/2002 | Feller |
| 2007/0034015 A1 | 2/2007 | Ara et al. |

FOREIGN PATENT DOCUMENTS

| | | |
|---|---|---|
| JP | 07-012901 Y2 | 3/1995 |
| JP | 2002-168665 A | 6/2002 |
| JP | 2007-047071 A | 2/2007 |
| JP | 2012-047706 A | 3/2012 |

\* cited by examiner

ELECTROMAGNETIC FLOWMETER, ELECTROMAGNETIC FLOW RATE MEASUREMENT SYSTEM, AND ELECTROMAGNETIC FLOW RATE MEASUREMENT METHOD

TECHNICAL FIELD

The present invention relates to an electromagnetic flowmeter for measuring a flow rate of liquid metal that flows in a large-diameter pipeline like, e.g., a core or piping of a fast reactor.

BACKGROUND ART

Conventionally, a flow rate of fluid flowing in a channel having various shapes such as an annular channel can be measured by using an electromagnetic flowmeter. There is known, as such an electromagnetic flowmeter, a technique disclosed in Patent Document 1. In the technique disclosed in Patent Document 1, a magnetic field generator is set such that both magnetic poles are arranged at one side of an outer wall of a pipeline.

More specifically, the technique disclosed in Patent document 1 includes an excitation device for forming a magnetic field perpendicular to a pipeline outer wall and a pair of electrodes for measuring electromotive force generated when conductive fluid crosses the magnetic field. The electrodes and both magnetic poles of the excitation device are arranged at one side of the pipeline outer wall.

PRIOR ART DOCUMENTS

Patent Documents

Patent Document 1: Japanese Patent Application Laid-Open Publication No. 2007-47071

SUMMARY OF THE INVENTION

Problems to be Solved by the Invention

The above conventional electromagnetic flowmeter for annular channel is increased in output voltage from the electrodes with an increase in a flow speed of fluid passing through the annular channel. When the flow speed of fluid to be measured is low, it is necessary to obtain large output voltage from the electrodes by increasing excitation current.

However, the larger the excitation current, the higher magnetic flux density of a magnetic field generated from a coil of the excitation device becomes, and the higher magnetic flux density acts locally on the fluid passing through the annular channel as resisting force, generating a flow speed distribution in a circumferential direction of the annular channel. As a result, when the flow speed of fluid to be measured is low, the conventional electromagnetic flowmeter for annular channel cannot obtain an accurate flow rate value.

In the conventional electromagnetic flowmeter, the excitation current is always supplied to an electromagnet of the excitation device, and temporal changes of an excitation current [A], a magnetic field [T], an electrode output [mV], and a flow speed [m/s] of sodium (Na) in the vicinity of the electromagnet are as illustrated in FIG. 10. As is clear from FIG. 10, the flow rate of Na changes under the influence of a magnetic field generated by the supplied excitation current, thus influencing the electrode output.

The present invention has been made in view of the above situation, and an object thereof is to provide an electromagnetic flowmeter, an electromagnetic flow rate measurement system, and an electromagnetic flow rate measurement method capable of suppressing occurrence of the flow rate distribution in the circumferential direction of a flow channel even when a flow speed of liquid metal is low and thus capable of performing accurate flow rate measurement.

Means for Solving the Problem

In order to achieve the above-mentioned object, according to an embodiment, there is provided an electromagnetic flowmeter comprising: an excitation member having a plurality of magnets which are arranged along an outer circumferential surface of a flow channel in which liquid metal flows so as to be spaced apart from one another by a predetermined interval and forming a magnetic field in a direction perpendicular to the outer circumferential surface of the flow channel; an electrode provided between the magnets of the excitation member and measuring voltage generated when the liquid metal crosses the magnetic field; and a pulse excitation current supply device supplying pulsed excitation current to the excitation member.

Furthermore in order to achieve the above-mentioned object, according to an embodiment, there is provided an electromagnetic flow rate measurement system comprising a plurality of electromagnetic flowmeters which are arranged in a circumferential direction of a flow channel in which liquid metal flows so as to be spaced apart from one another by a predetermined interval, the electromagnetic flowmeters each including: an excitation member having a plurality of magnets which are arranged along an outer circumferential surface of the flow channel so as to be spaced apart from one another by a predetermined interval and forming a magnetic field in a direction perpendicular to the outer circumferential surface of the flow channel; an electrode provided between the magnets of the excitation member and measuring voltage generated when the liquid metal crosses the magnetic field; and a pulse excitation current supply device supplying pulsed excitation current to the excitation member.

In order to achieve the above-mentioned object, according to an embodiment, there is provided an electromagnetic flow rate measurement method comprising: a magnetic field generation step of generating a magnetic field in a direction perpendicular to an outer circumferential surface of a flow channel in which liquid metal flows by means of an excitation member having a plurality of magnets which are arranged along the outer circumferential surface of the flow channel so as to be spaced apart from one another by a predetermined interval; and a voltage measurement step of measuring voltage generated when the liquid metal crosses the magnetic field by means of an electrode provided between the magnets of the excitation member, wherein in the magnetic field generation step, pulsed excitation current is supplied from a pulse excitation supply device to the excitation member.

Advantage of the Invention

According to the electromagnetic flowmeter, electromagnetic flow rate measurement system, and electromagnetic flow rate measurement method of the present invention, it is possible to suppress occurrence of the flow speed distribution in the circumferential direction of the flow channel to thereby achieve accurate flow rate measurement.

EMBODIMENTS FOR CARRYING OUT THE INVENTION

Embodiments of an electromagnetic flow rate measurement system and an electromagnetic flow rate measurement method according to the present invention will be described below with reference to the drawings.

First Embodiment

Figure 1:
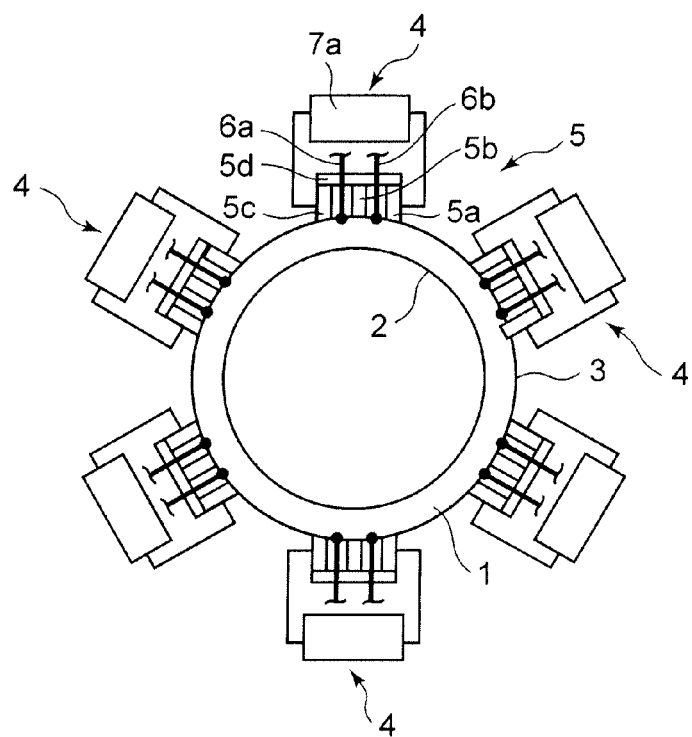
FIG. 1 is a cross-sectional configuration view illustrating a first embodiment of an electromagnetic flow rate measurement system according to the present invention.
Figure 2:
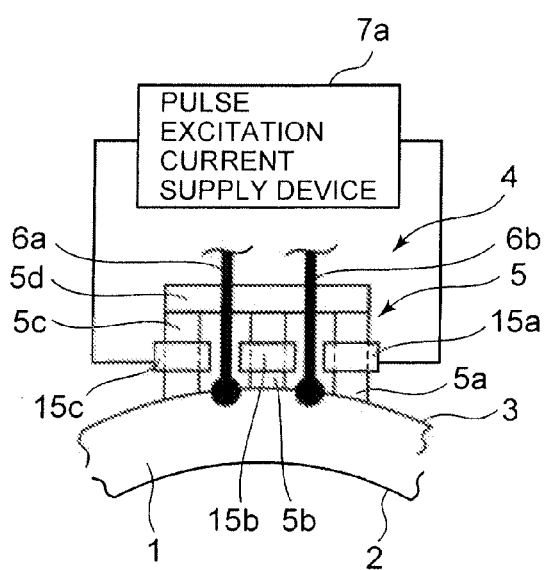
FIG. 2 is an enlarged view of an electromagnetic flowmeter of FIG. 1.
Figure 3:
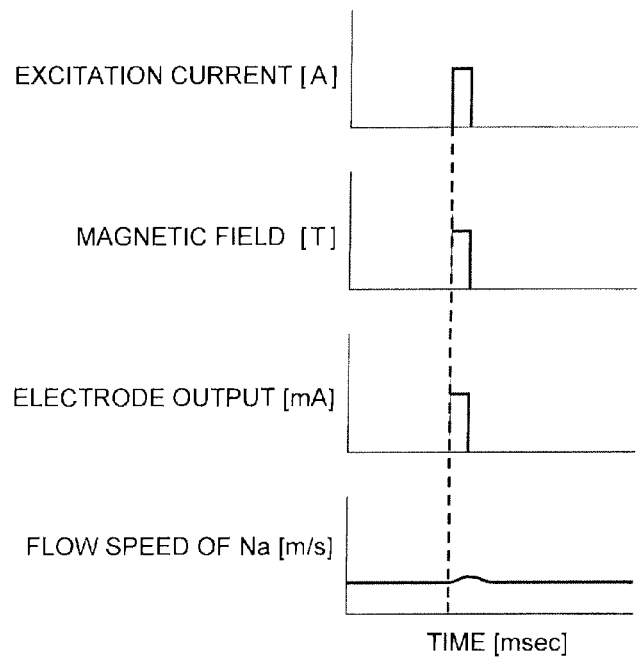
FIG. 3 is a timing chart illustrating temporal changes of an excitation current, a magnetic field, an electrode output, and a flow speed of Na in the electromagnetic flowmeter of FIG. 1.

FIG. 1 is a cross-sectional configuration view illustrating a first embodiment of an electromagnetic flow rate measurement system according to the present invention. FIG. 2 is an enlarged view of an electromagnetic flowmeter of FIG. 1. FIG. 3 is a timing chart illustrating temporal changes of an excitation current, a magnetic field, an electrode output, and a flow speed of Na in the electromagnetic flowmeter of FIG. 1.

As illustrated in FIG. 1, an annular channel 1 is a large-sized (large-diameter) pipeline having an annular shape in cross section, in which liquid metal such as sodium flows as fluid to be measured, as in, e.g., a core or piping of a fast reactor. The annular channel 1 includes inner and outer ducts 2 and 3 each made of a non-magnetic body. Six electromagnetic flowmeters 4 are arranged on an outer circumferential surface of the outer duct 3 so as to be spaced apart from one another by a predetermined interval. The number of the electromagnetic flowmeters 4 arranged on the outer circumferential surface of the outer duct 3 is determined by a relationship between a length of an outer circumference of the annular channel 1 and a width of each of the electromagnetic flowmeters 4. In the present embodiment, six electromagnetic flowmeters 4 are arranged as described above.

The electromagnetic flowmeters 4 each include an excitation member 5 for forming a magnetic field in a direction normal to an axis of the annular channel 1 and a pair of electrodes 6a and 6b for measuring voltage generated when the liquid metal crosses the magnetic field. The voltage is taken outside through the pair of electrodes 6a and 6b, and a flow rate or flow speed of the liquid metal is calculated based on a measurement value of the voltage.

The excitation member 5 has three electromagnets 5a, 5b and 5c which are arranged so as to be spaced apart from one another by a predetermined interval. Leading ends of the three electromagnets 5a, 5b and 5c contact the outer circumferential surface of the annular channel 1. The electrodes 6a and 6b are symmetrically arranged on both sides of the center electromagnets 5b. Rear ends of the electromagnets 5a, 5b and 5c are connected to a connection portion 5d.

Excitation coils 15a, 15b and 15c are wound around the electromagnets 5a, 5b and 5c, respectively, as illustrated in FIG. 2. Current flows through the excitation coils 15a, 15b and 15c such that a polarity of a magnetic pole appearing at the leading end of the center electromagnet 5b and a polarity of magnetic poles appearing at the leading ends of both-side electromagnets are opposite to each other. That is, the electromagnets 5a, 5b and 5c are arranged such that N-polarity and S-polarity appear alternately along the outer circumferential surface of the outer duct 3.

A pulse excitation current supply device 7a supplies pulsed excitation current to the excitation coils 15a, 15b and 15c of the respective electromagnets 5a, 5b and 5c. The excitation current is supplied for as short a time period as several m sec.

The following describes operation of the present embodiment.

When the pulsed excitation current is supplied from the pulse excitation current supply device 7a to the excitation coils 15a, 15b and 15c of each electromagnetic flowmeter 4, a magnetic flux from the leading ends (N-poles) of both-side electromagnets 5a and 5c of each electromagnetic flowmeter 4 to the leading end (S-pole) of the center electromagnet 5b is generated to form a synthetic magnetic field in a direction (radial direction of the annular channel 1) perpendicular to the outer duct 3 in the vicinity the leading end of the center electromagnet 5b.

As a result, according to Fleming's right hand rule, in the liquid metal around the leading end of the center electromagnet 5b, electromotive force (voltage) is generated in accordance with a flow speed of the liquid metal in a direction perpendicular to both the direction (radial direction of the annular channel 1) of the magnetic field and a direction (axial direction of the annular channel 1) of a flow of the liquid metal, in other words, in a direction of a line connecting the both electrodes 6a and 6b. The electromotive force is taken outside through the both electrodes 6a and 6b, and a flow rate or flow speed of the liquid metal is calculated based on a measurement value thereof by a not-illustrated flow rate conversion circuit.

When the excitation current is supplied to the excitation coils 15a, 15b and 15c of the respective electromagnets 5a, 5b and 5c of the electromagnetic flowmeter 4, a magnetic field is generated, and a time required to generate an electrode output is determined by a speed of free electrons moving in a path between the both electrodes 6a and 6b. This speed is extremely high, while a change in the flow speed of the liquid metal (Na flow speed) that has been subject to the magnetic field is slow.

For this reason, in the present embodiment, the pulsed excitation current is supplied from the pulse excitation current supply device 7a to the excitation coils 15a, 15b and 15c of the respective electromagnets 5a, 5b and 5c. As a result, as illustrated in FIG. 3, the electrode output can be obtained before the change in the Na flow speed is promoted by the generated magnetic field.

In a nuclear power plant, a measurement value of the flow rate or flow speed of the liquid metal is sampled at a constant interval, such as every 24 hours.

As described above, according to the present embodiment, the pulsed excitation current is supplied from the pulse excitation current supply device 7a to the excitation coils 15a, 15b and 15c of the respective electromagnets 5a, 5b and 5c, so that even when the flow speed of the liquid metal is low, it is possible to prevent the flow speed distribution in the circumferential direction of the annular channel 1 to thereby achieve accurate flow rate measurement.

Although three electromagnets 5a, 5b and 5c and two electrodes 6a and 6b (pair of electrodes 6a and 6b) are arranged in the present embodiment, the number of electromagnets and electrodes to be arranged may be changed appropriately.

Further, although six each electromagnetic flowmeters 4 are used to calculate the flow rate or flow speed of the liquid metal in the present embodiment, the number of the electromagnetic flowmeters 4 to be used is not limited to this, but the use of at least one electromagnetic flowmeter 4 can achieve the same measurement result.

Second Embodiment

Figure 4:
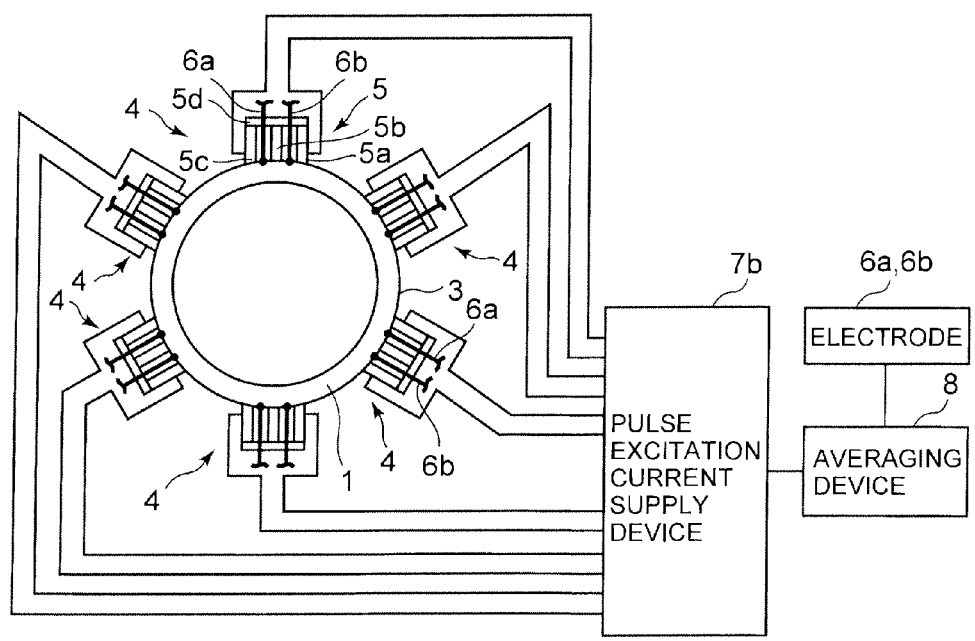
FIG. 4 is a cross-sectional configuration view illustrating a second embodiment of an electromagnetic flow rate measurement system according to the present invention.

FIG. 4 is a cross-sectional configuration view illustrating a second embodiment of an electromagnetic flow rate measurement system according to the present invention.

In the following embodiments, description on the same configurations and functions as those of the first embodiment will be omitted, and only different configurations and functions will be described. Further, the electromagnetic flowmeter 4 in the following embodiments has the same configuration and operation as those of the electromagnetic flowmeters 4 of the first embodiment, so the same reference numerals are used for the identical components, and descriptions thereof will be omitted.

As illustrated in FIG. 4, in the present embodiment, six electromagnetic flowmeters 4 are connected to a common pulse excitation current supply device 7b. The pulse excitation current supply device 7b has two functions: a function of selecting any of the six electromagnetic flowmeters 4 and a function of supplying short-lasting pulsed excitation current to the excitation coils 15a, 15b and 15c of the excitation member 5 of the selected electromagnetic flowmeters 4.

The pulse excitation current supply device 7b is connected with an averaging device 8. The averaging device 8 acquires, as needed, the output voltage generated from the electrodes 6a and 6b of the electromagnetic flowmeters 4 that have sequentially selected by the pulse excitation current supply device 7b to be supplied with the excitation current and averages the acquired output voltage.

The following describes operation of the present embodiment.

The pulse excitation current supply device 7b sequentially selects any of the six electromagnetic flowmeters 4 and supplies the pulsed excitation current to the selected electromagnetic flowmeters 4, and a magnetic field is generated from the electromagnets 5a, 5b and 5c of each of the selected electromagnetic flowmeters 4. According to Fleming's right hand rule, an electromotive voltage signal is generated from the electrodes 6a and 6b by the magnetic field. Then, the pulse excitation current supply device 7b applies, as needed, the output voltage generated from the electrodes 6a and 6b of the selected electromagnetic flowmeters 4 to the averaging device 8. The averaging device 8 acquires the output voltage from the selected electromagnetic flowmeters 4 and then averages the acquired output voltage.

The other configurations and operations are the same as those of the first embodiment, and descriptions thereof will be omitted.

As described above, according to the present embodiment, the electromagnetic flowmeters 4 are sequentially selected by the pulse excitation current supply device 7b, the excitation current is supplied at high speed to the excitation coils 15a, 15b and 15c, the measured output voltage are averaged by the averaging device 8, and the averaged value is used as a representative value, whereby it is possible to obtain an effect of suppressing influence of individual variability, in addition to the effect of the first embodiment.

Further, according to the present embodiment, the pulse excitation current supply device 7b sequentially selects the electromagnetic flowmeters 4 so as to supply the excitation current thereto. This configuration requires only one pulse excitation current supply device 7b, allowing the structure to be simplified.

Third Embodiment

Figure 5:
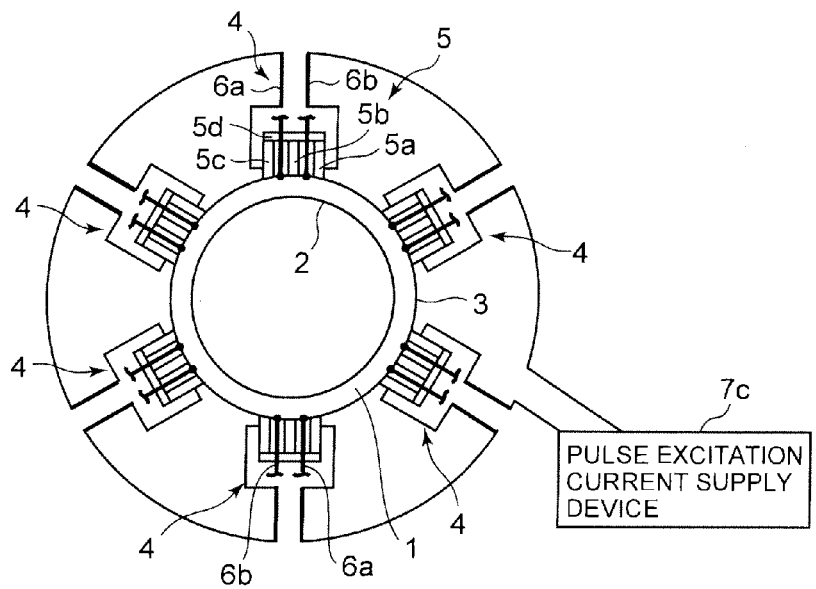
FIG. 5 is a cross-sectional configuration view illustrating a third embodiment of an electromagnetic flow rate measurement system according to the present invention.

FIG. 5 is a cross-sectional configuration view illustrating a third embodiment of an electromagnetic flow rate measurement system according to the present invention.

As illustrated in FIG. 5, in the present embodiment, the excitation coils 15a, 15b and 15c of the respective electromagnets 5a, 5b and 5c of the six electromagnetic flowmeters 4 are all sequentially connected one another in series. All the excitation coils 15a, 15b and 15c thus connected in series are connected to a pulse excitation current supply device 7c.

The pulse excitation current supply device 7c can supply short-lasting pulsed excitation current having the same excitation current value to the excitation coils 15a, 15b and 15c of the series-connected six electromagnetic flowmeters 4.

The following describes operation of the present embodiment.

The pulse excitation current supply device 7c supplies the pulsed excitation current having the same excitation current value to the excitation coils 15a, 15b and 15c of the six electromagnetic flowmeters 4, and a magnetic field is generated from the electromagnets 5a, 5b and 5c of each of the electromagnetic flowmeters 4. According to Fleming's right hand rule, an electromotive voltage signal is generated from the electrodes 6a and 6b by the magnetic field. The electromotive voltage signal is taken outside, and a flow rate or flow speed of the liquid metal is calculated based on a measurement value thereof by a not-illustrated flow rate conversion circuit.

As described above, according to the present embodiment, the same excitation current value is supplied from the pulse excitation current supply device 7c to the plurality of electromagnetic flowmeters 4, so that it is possible to reduce individual variability between values of the output voltage from the electromagnetic flowmeters 4 as compared to a case where the excitation currents are supplied individually to the electromagnetic flowmeters 4. Further, this configuration requires only one pulse excitation current supply device 7c, allowing the structure to be simplified.

Fourth Embodiment

Figure 6:
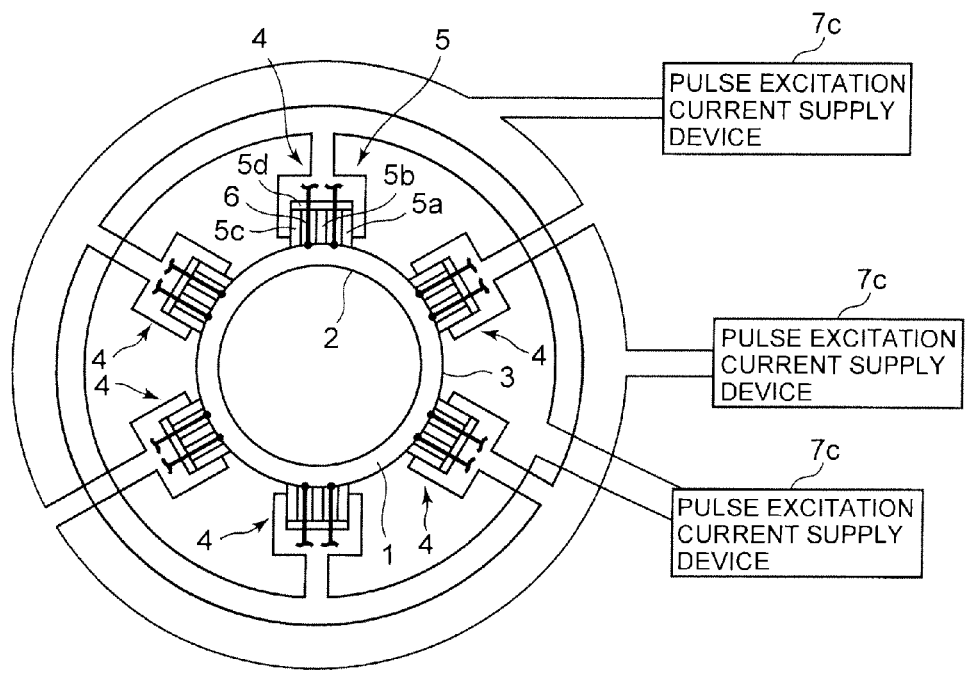
FIG. 6 is a cross-sectional configuration view illustrating a fourth embodiment of an electromagnetic flow rate measurement system according to the present invention.

FIG. 6 is a cross-sectional configuration view illustrating a fourth embodiment of an electromagnetic flow rate measurement system according to the present invention.

As illustrated in FIG. 6, the excitation coils 15a, 15b and 15c of the electromagnetic flowmeters 4 disposed mutually opposite to each other across the annular channel 1 are connected in series to be paired with each other, and three pairs thereof are provided. One pair of the electromagnetic flowmeters 4 are connected to a single pulse excitation current supply device 7c. That is, three sets each including the pair of electromagnetic flowmeters 4 and one pulse excitation current supply device 7c are provided.

As in the third embodiment, the three pulse excitation current supply devices 7c each can supply short-lasting pulsed excitation current having the same excitation current value to the excitation coils 15a, 15b and 15c of the pair of series-connected electromagnetic flowmeters 4.

The following describes operation of the present embodiment.

The three pulse excitation current supply device 7c each supply the pulsed excitation current having the same excitation current value to the excitation coils 15a, 15b and 15c of the two electromagnetic flowmeters 4, and a magnetic field is generated from the electromagnets 5a, 5b and 5c of each of the electromagnetic flowmeters 4. According to Fleming's right hand rule, an electromotive voltage signal is generated from the electrodes 6a and 6b by the magnetic field. The electromotive voltage signal is taken outside, and a flow rate or flow speed of the liquid metal is calculated based on a measurement value thereof by a not-illustrated flow rate conversion circuit.

As described above, according to the present embodiment, the pulsed excitation current having the same excitation current value is supplied from the pulse excitation current supply device 7c to the pair of electromagnetic flowmeters 4, and the electromotive voltage signals are acquired by means of not-illustrated three flow rate conversion circuit, respectively. This configuration can be applied to a flowmeter to be provided in a safety protection system for which two outputs are required from each of three systems in a general nuclear power plant.

Fifth Embodiment

Figure 7:
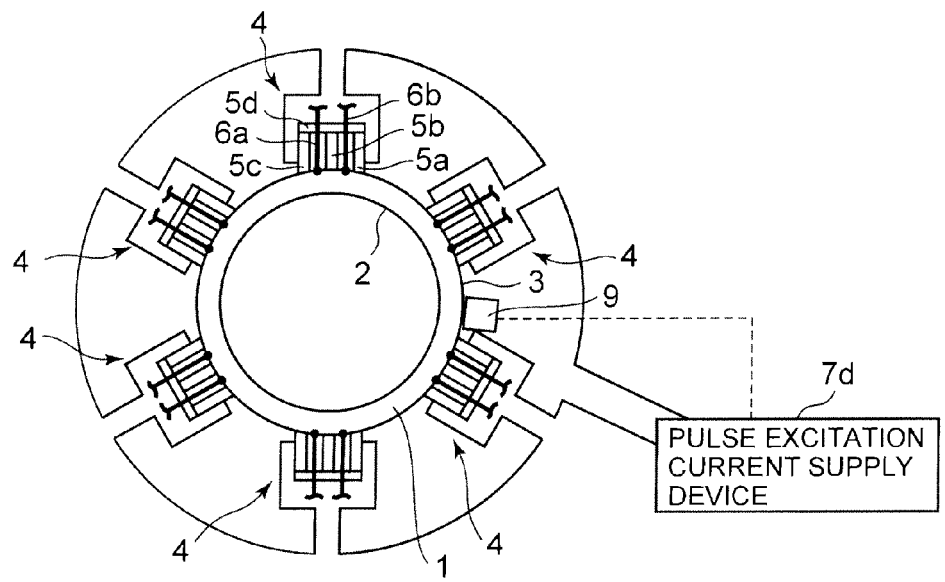
FIG. 7 is a cross-sectional configuration view illustrating a fifth embodiment of an electromagnetic flow rate measurement system according to the present invention.

FIG. 7 is a cross-sectional configuration view illustrating a fifth embodiment of an electromagnetic flow rate measurement system according to the present invention.

As illustrated in FIG. 7, in the present embodiment, a search coil 9 serving as a magnetic field measuring device is disposed in the vicinity of one of the six electromagnetic flowmeters 4 in the configuration of the third embodiment illustrated in FIG. 5.

More specifically, the excitation coils 15a, 15b and 15c of the respective electromagnets 5a, 5b and 5c of the six electromagnetic flowmeters 4 are all sequentially connected one another in series. All the excitation coils 15a, 15b and 15c thus connected in series are connected to a pulse excitation current supply device 7d.

The pulse excitation current supply device 7d can supply short-lasting pulsed excitation current having the same excitation current value to the excitation coils of the series-connected six electromagnetic flowmeters 4.

The search coil 9 capable of transmitting a signal to the pulse excitation current supply device 7d is disposed in the vicinity of one side of one of the six electromagnetic flowmeters 4. That is, the search coil 9 is disposed in the vicinity of one side of the electromagnet 5c of the electromagnetic flowmeter 4. The search coil 9 measures magnetic flux density of a magnetic field generated from the electromagnet 5c when the excitation current is supplied to the electromagnetic flowmeter 4. Thus, the search coil 9 is disposed within a range of the magnetic field of the electromagnet 5c.

The following describes operation of the present embodiment.

The pulse excitation current supply device 7d supplies the pulsed excitation current having the same excitation current value to the excitation coils 15a, 15b and 15c of the six electromagnetic flowmeters 4, and a magnetic field is generated from the electromagnets 5a, 5b and 5c of each of the electromagnetic flowmeters 4. According to Fleming's right hand rule, an electromotive voltage signal is generated from the electrodes 6a and 6b by the magnetic field. The electromotive voltage signal is taken outside, and a flow rate or flow speed of the liquid metal is calculated based on a measurement value thereof by a not-illustrated flow rate conversion circuit.

Then, when the excitation current is supplied from the pulse excitation current supply device 7d, the magnetic flux density of the magnetic field generated from the electromagnet 5c is measured by the search coil 9. A measurement signal obtained by the search coil 9 is transmitted to the pulse excitation current supply device 7d. This allows a secular change of the magnetic field to be monitored.

As described above, according to the present embodiment, the magnetic field generated from the electromagnet 5c by the supply of the excitation current is measured by the search coil 9, and a measurement signal obtained by the search coil 9 is transmitted to the pulse excitation current supply device 7d, whereby a secular change of the magnetic field can be monitored. As a result, it is possible to detect a failure or a function degradation of the electromagnetic flowmeter 4 in the early stages and to control the excitation current according to the secular change of the magnetic field to set the excitation current to a value at which a predetermined output voltage can be obtained.

Although the search coil 9 is disposed in one side of the electromagnet 5c in the present embodiment, the search coil 9 may be disposed on one side of the electromagnet 5a. Further alternatively, the search coils 9 may be disposed on one sides of the respective electromagnets 5a and 5c. By disposing the search coils 9 on one sides of the respective electromagnets 5a and 5c as described above, magnetic field measurement accuracy can be enhanced.

Further, although the measurement signal obtained by the search coil 9 is transmitted to the pulse excitation current supply device 7d in the present embodiment, the measurement signal may be transmitted to a monitoring device. The same can be said for a sixth embodiment to be described below.

Sixth Embodiment

Figure 8:
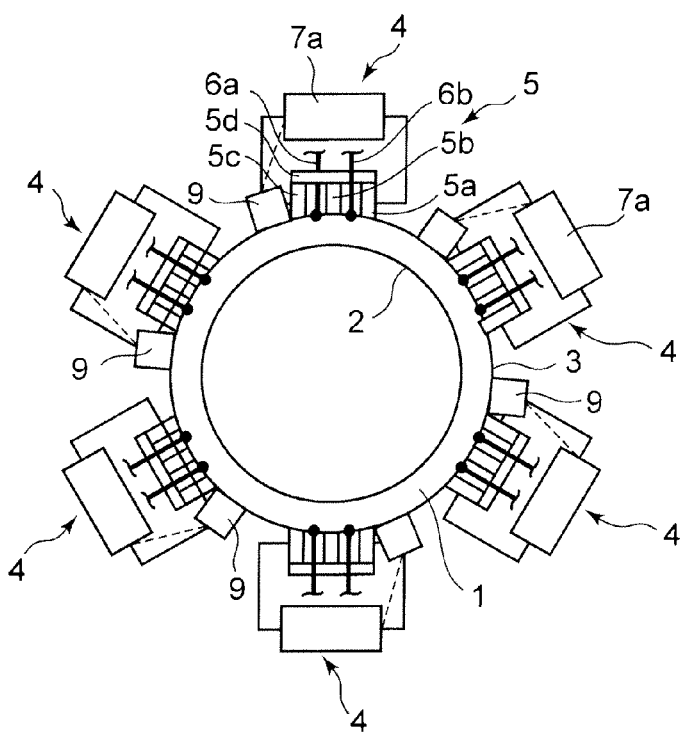
FIG. 8 is a cross-sectional configuration view illustrating a sixth embodiment of an electromagnetic flow rate measurement system according to the present invention.

FIG. 8 is a cross-sectional configuration view illustrating a sixth embodiment of an electromagnetic flow rate measurement system according to the present invention.

As illustrated in FIG. 8, in the present embodiment, the search coils 9 are disposed in the vicinity of one sides of the respective six electromagnetic flowmeters 4 in the configuration of the first embodiment illustrated in FIG. 1. That is, the search coils 9 are disposed in the vicinity of one sides of the electromagnets 5c of the respective electromagnetic flowmeters 4. The search coils 9 each measure magnetic flux density of a magnetic field generated from the electromagnets 5c when the excitation current is supplied to the electromagnetic flowmeters 4. Thus, the search coils 9 are each disposed within a range of the magnetic field of the electromagnet 5c.

As in the first embodiment, the pulse excitation current supply device 7a supplies the pulsed excitation current to the excitation coils 15a, 15b and 15c of the respective electromagnets 5a, 5b and 5c.

The following describes operation of the present embodiment.

The pulse excitation current supply devices 7a supply the pulsed excitation current having the same excitation current value to the excitation coils 15a, 15b and 15c of the respective six electromagnetic flowmeters 4, and a magnetic field is generated from the electromagnets 5a, 5b and 5c of each of the electromagnetic flowmeters 4. According to Fleming's right hand rule, an electromotive voltage signal is generated from the electrodes 6a and 6b by the magnetic field. The electromotive voltage signal is taken outside, and a flow rate or flow speed of the liquid metal is calculated based on a measurement value thereof by a not-illustrated flow rate conversion circuit.

Then, when the excitation current is supplied from each of the pulse excitation current supply devices 7a, the magnetic flux density of the magnetic field generated from each electromagnet 5c is measured by the search coil 9. A measurement signal obtained by the search coil 9 is transmitted to the corresponding pulse excitation current supply device 7a. This allows a secular change of the magnetic field of each electromagnetic flowmeter 4 to be monitored.

As described above, according to the present embodiment, the magnetic fields generated from the respective electromagnets 5c by the supply of the excitation current to the six electromagnetic flowmeters 4 are measured by the respective search coils 9, and measurement signals obtained by the search coils 9 are transmitted to the corresponding pulse excitation current supply devices 7a, whereby a secular change of each magnetic field can be monitored. As a result, it is possible to detect a failure or a function degradation of each electromagnetic flowmeter 4 in the early stages and to control the excitation current according to the secular change of the magnetic field to set the excitation current to a value at which a predetermined output voltage can be obtained.

Further, according to the present embodiment, it is possible to supply the excitation current of a given value to the plurality of electromagnetic flowmeters 4 individually, and the search coils 9 are provided for respective electromagnetic flowmeters 4, so that it is possible to detect a failure or a function degradation of individual electromagnetic flowmeters 4 and to control the excitation current according to the secular change of the magnetic field to set the excitation current to a value at which a predetermined output voltage can be obtained.

Although the preferred embodiments of the present invention have been described above, the embodiments are merely illustrative and do not limit the scope of the present invention. These novel embodiments can be practiced in other various forms, and various omissions, substitutions and changes may be made without departing from the scope of the invention.

For example, although the six electromagnetic flowmeters 4 are arranged along the outer circumferential surface of the annular channel 1 so as to be spaced apart from one another by a predetermined interval in each of the above-described embodiments, the present invention is not limited to this, but the arrangement of at least one or more electromagnetic flowmeters 4 on the outer circumferential surface of the annular channel 1 can achieve the same effect.

Further, although the annular channel 1 having an annular shape in cross section is used as the flow channel in each of the above-described embodiments, the present invention is not limited to this. For example, the flow channel to be used in the present invention may have a vertically-long rectangular cross section, a horizontally-long rectangular cross section, or other cross-sectional shape.

Further, the excitation device in each of the above-described embodiments includes a direct-current type excitation device. Alternatively, a permanent magnet type excitation device or an alternating-current type excitation device can be used instead of the direct-current type excitation device.

Further, although a rectangular waveform is used as the pulsed excitation current in each of the above-described embodiments, a triangular waveform or a sawtooth waveform may also be used. Further, in addition to the excitation current having the rectangular waveform, a waveform that can eliminate influence of a residual magnetic field may be used.

The embodiments and the modifications thereof are included in the scope or spirit of the present invention and in the appended claims and their equivalents.

For example, although the annular channel is used in each of the above-described embodiments, the shape of the flow channel is not limited to this. The configuration of each of the above-described embodiments may be applied to a case where a flow speed distribution occurs in the flow channel by a magnetic flux generated by constant excitation of a magnet of the electromagnet flowmeter. More specifically, the configuration of each of the above-described embodiments may be applied to a configuration in which the magnetic flux does not pass the entire flow channel but a strong magnetic flux passes a part of the flow channel.

Figure 9A:
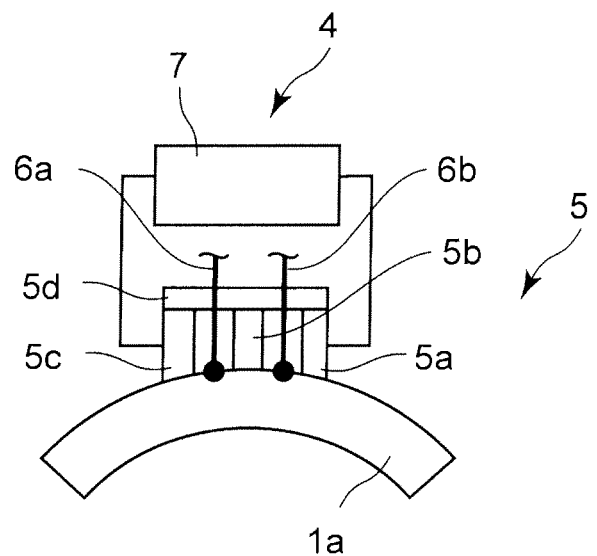
FIGS. 9A and 9B are each a cross-sectional configuration view illustrating a modification of a flow channel.
Figure 9B:
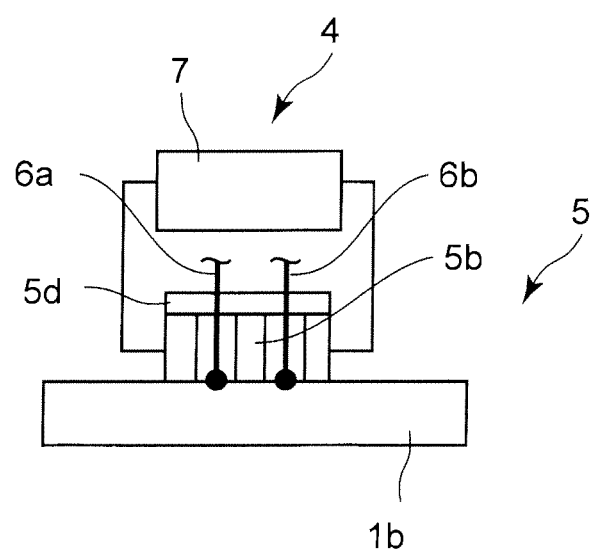
Figure 10:
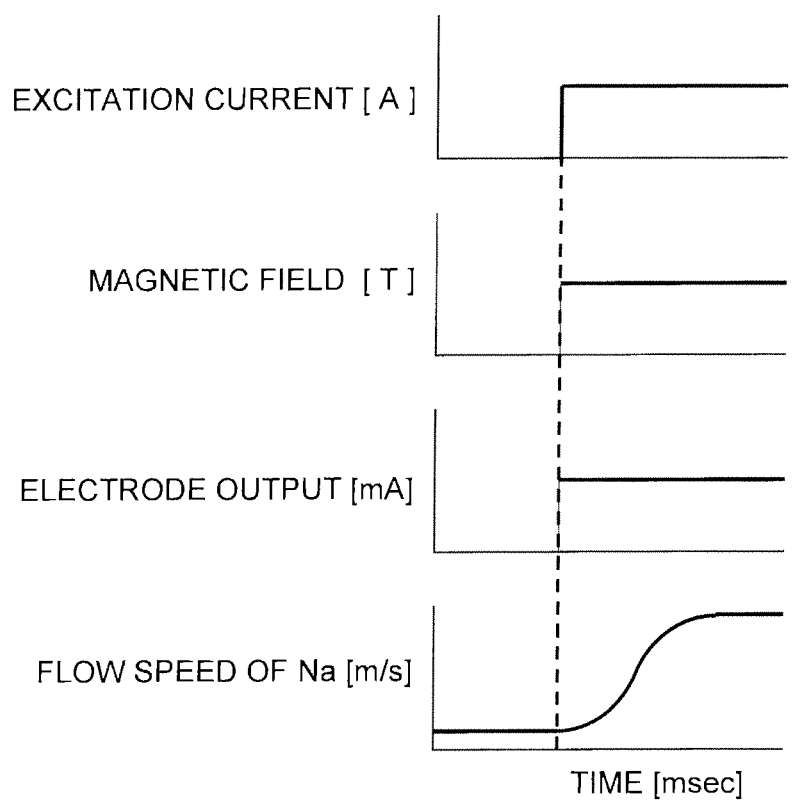
FIG. 10 is a timing chart illustrating temporal changes of the excitation current, magnetic field, electrode output, and flow speed of Na in a conventional electromagnetic flowmeter.

In other words, as another example of the annular channel, a flow channel 1a having a circular arc shape (part of a circular ring) in cross section perpendicular to an axial direction of the flow channel (FIG. 9A), a flow channel 1b having a rectangular shape in cross section perpendicular to the axial direction of the flow channel (FIG. 9B), and the like are conceivable. Alternatively, even in a case where a circular tube flow channel (having a circular shape in cross section perpendicular to the axial direction of the flow channel) and where the influence of the magnetic flux is not local, application of the configuration of each of the above-described embodiments can reduce the influence on the electromagnetic flowmeter due to the excitation, provided that the flow speed of coolant is low (for example, a case where coolant is circulated not by a pump but by natural circulation).

EXPLANATION OF THE SYMBOLS

1: Annular channel
1a: Circular arc flow channel
1b: Rectangular flow channel
2: Inner duct
3: Outer duct
4: Electromagnetic flowmeter
5: Excitation member
5a, 5b, 5c: Electromagnet
6a, 6b: Electrode
7: Pulse excitation current supply device
7a: Pulse excitation current supply device
7b: Pulse excitation current supply device
7c: Pulse excitation current supply device
7d: Pulse excitation current supply device
8: Averaging device
9: Search coil (magnetic field measuring device)
15a, 15b, 15c: Excitation coil

What is claimed is:

1. An electromagnetic flow rate measurement system comprising a plurality of electromagnetic flowmeters which are arranged in a circumferential direction of a flow channel in which liquid metal flows so as to be spaced apart from one another, the electromagnetic flowmeters each including:
an excitation member having a plurality of magnets which are arranged along an outer circumferential surface of the flow channel so as to be spaced apart from one another and form a magnetic field in a direction perpendicular to the outer circumferential surface of the flow channel;
an electrode provided between the magnets of the excitation member and configured to measure voltage generated when the liquid metal crosses the magnetic field; and
a pulse excitation current supply device configured to supply pulsed excitation current to the excitation member.

2. The electromagnetic flow rate measurement system according to claim 1, wherein
a plurality of the pulse excitation current supply devices are provided in correspondence with the plurality of electromagnetic flowmeters.

3. The electromagnetic flow rate measurement system according to claim 2, wherein
a magnetic field measuring device configured to measure the magnetic field generated from the excitation member when the pulsed excitation current is supplied to each of the electromagnet flowmeters is provided for each of the electromagnetic flowmeters.

4. The electromagnetic flow rate measurement system according to claim 1, wherein
the pulse excitation current supply device is provided singularly and is configured to select any of the plurality of electromagnetic flowmeters so as to supply the pulsed excitation current.

5. The electromagnetic flow rate measurement system according to claim 1, wherein
the pulse excitation current supply device is provided singularly and is configured to supply the pulsed excitation current to the series-connected excitation members of the respective electromagnetic flowmeters.

6. The electromagnetic flow rate measurement system according to claim 5, wherein
a magnetic field measuring device configured to measure the magnetic field generated from the excitation member when the pulsed excitation current is supplied to the electromagnet flowmeter is provided in one of the electromagnetic flowmeters.

7. The electromagnetic flow rate measurement system according to claim 1, wherein
a plurality of pairs of mutually opposing electromagnetic flowmeters are provided, and
the pulse excitation current supply device is provided for each pair of the mutually opposing electromagnetic flowmeters.

8. An electromagnetic flow rate measurement method comprising:
a magnetic field generation step of generating a magnetic field in a direction perpendicular to an outer circumferential surface of a flow channel in which liquid metal flows by means of an excitation member having a plurality of magnets which are arranged along the outer circumferential surface of the flow channel so as to be spaced apart from one another; and
a voltage measurement step of measuring voltage generated when the liquid metal crosses the magnetic field by means of an electrode provided between the magnets of the excitation member, wherein
in the magnetic field generation step, pulsed excitation current is supplied from a pulse excitation supply device to the excitation member.

9. An electromagnetic flowmeter comprising:
an excitation member having a plurality of magnets which are arranged along an outer circumferential surface of a flow channel in which liquid metal flows so as to be spaced apart from one another and form a magnetic field in a direction perpendicular to the outer circumferential surface of the flow channel;
an electrode provided between the magnets of the excitation member and configured to measure voltage generated when the liquid metal crosses the magnetic field; and
a pulse excitation current supply device configured to supply pulsed excitation current to the excitation member, wherein
the pulsed excitation current is supplied for a time period of several milliseconds.

10. The electromagnetic flow rate measurement system according to claim 1, wherein
the pulsed excitation current is supplied for a time period of several milliseconds.

11. The electromagnetic flow rate measurement method according to claim 8, wherein
the pulsed excitation current is supplied for a time period of several milliseconds.

* * * * *